United States Patent [19]

Taniai

[11] Patent Number: 5,203,006
[45] Date of Patent: Apr. 13, 1993

[54] SYSTEM FOR SELECTING NEXT INSTRUCTION ADDRESS BETWEEN UNIT INCREMENTED ADDRESS AND ADDRESS FROM TABLE SPECIFIED BY OPERATING CONDITION SIGNALS

[75] Inventor: Takayoshi Taniai, Kawasaki, Japan

[73] Assignee: Fujitsu Limited, Kanagawa, Japan

[21] Appl. No.: 338,823

[22] Filed: Apr. 17, 1989

[30] Foreign Application Priority Data

Apr. 22, 1988 [JP] Japan ................. 63-100636

[51] Int. Cl.⁵ .................. G06F 9/26; G06F 9/32
[52] U.S. Cl. ........................ 395/800; 364/251.1;
364/261.4; 364/261.5; 364/261.6; 364/262.8;
364/938.1; 364/938.3; 364/938.4; 364/946.6;
364/960.6; 364/DIG. 1; 395/400; 395/775
[58] Field of Search ... 364/200 MS File, 900 MS File, 364/400, 775; 395/800

[56] References Cited

U.S. PATENT DOCUMENTS

| | | | |
|---|---|---|---|
| 3,634,883 | 1/1972 | Kreidermacher | 364/200 |
| 3,868,649 | 2/1975 | Sato et al. | 364/200 |
| 4,062,058 | 12/1977 | Haynes | 364/200 |
| 4,179,731 | 12/1979 | Yamazaki | 364/200 |
| 4,181,938 | 1/1980 | Suzuki et al. | 364/200 |
| 4,338,661 | 7/1982 | Trodennick et al. | 364/200 |
| 4,679,141 | 7/1987 | Pomerene et al. | 364/200 |
| 4,691,277 | 9/1987 | Kronstadt et al. | 364/200 |
| 4,763,245 | 8/1988 | Emma et al. | 364/200 |
| 4,764,861 | 8/1988 | Shibuya | 364/200 |
| 4,853,840 | 8/1989 | Shibuya | 364/200 |
| 4,860,199 | 8/1989 | Langendorf et al. | 364/200 |
| 4,943,908 | 7/1990 | Emma et al. | 364/200 |
| 4,984,151 | 1/1991 | Dujari | 364/200 |
| 4,984,154 | 1/1991 | Hanatani et al. | 364/200 |
| 5,058,007 | 10/1991 | Feil | 364/200 |

FOREIGN PATENT DOCUMENTS 114194 8/1984 European Pat. Off. .

OTHER PUBLICATIONS

"Microprogram Control System", J. A. Hirschman et al., IBM Technical Disclosure Bulletin, vol. 22, No. 10, Mar. 1980, pp. 4753–4758.

"Microprogram Control System", Shinichi Okugawa, JP-A-62-186333, Aug. 14, 1987, Patent Abstracts of Japan, vol. 12, No. 34, (P-662) [2882], Feb. 2, 1988.

Primary Examiner—Thomas C. Lee
Assistant Examiner—Ken S. Kim
Attorney, Agent, or Firm—Nikaido, Marmelstein, Murray & Oram

[57] ABSTRACT

A microprogram branching method and apparatus generate a continue address by successively incrementing an address, generate a branch address by referring to a branch address table depending on predetermined branch conditions, where the branch address table prestores branch addresses, discriminate whether or not a branch is to be made depending on the predetermined branch conditions and obtaining a discrimination result, select the continue address normally and selecting the branch address when the discrimination result indicates that the branch is to be made, and output a data which is read out from an address of a main memory depending on the selected address, where the main memory prestores microprograms.

11 Claims, 9 Drawing Sheets

```
                                                                    MSMA0~8
  M M M M M M O O M M D D S D B D O O O B E S     (ADDRESS)
  S S S S S S M M S S T T T T I I R O O E D S
  C C C C C C O I F B P P P P U O E C C R O C
  D D D D D C     I T     Y         Q O O R N S
  0 1 2 3 4 N     N E     1         X D D X E E
              F     A N               E E     X
              E     L D               O I
              X     X X
  X X X X X X X X X X X X X X X X X X X 1 1 0    A
  X X X X X X X X X X X X X X X X X X X 1 0 1    B
  X X X X X X X X X X X X X X X X X X X 0 1 1    C

SYSTEM FOR SELECTING NEXT INSTRUCTION ADDRESS BETWEEN UNIT INCREMENTED ADDRESS AND ADDRESS FROM TABLE SPECIFIED BY OPERATING CONDITION SIGNALS

BACKGROUND OF THE INVENTION

The present invention generally relates to microprogram branching methods and microsequencers employing such microprogram branching methods, and more particularly to a microprogram branching method and a microsequencer employing the microprogram branching method for realizing a high-speed branch process with a reduced number of program steps. The present invention is suited for application to a direct memory access controller (DMAC) which employs an internal control system using microprograms.

Generally, when constructing a microcomputer system, various peripheral large scale integrated circuits (LSIs) are required in addition to a central processing unit (CPU), and the DMAC is one of such peripheral LSIs. With the increase of the number of bits of the CPU to 16 or 32 bits, for example, there is now a demand for high performance DMACs which have a large number of functions. For this reason, there are proposed DMACs which employ the internal control system using microprograms, and the design facility and flexibility of the DMACs are improved together with the improved functions thereof.

Figure 1:
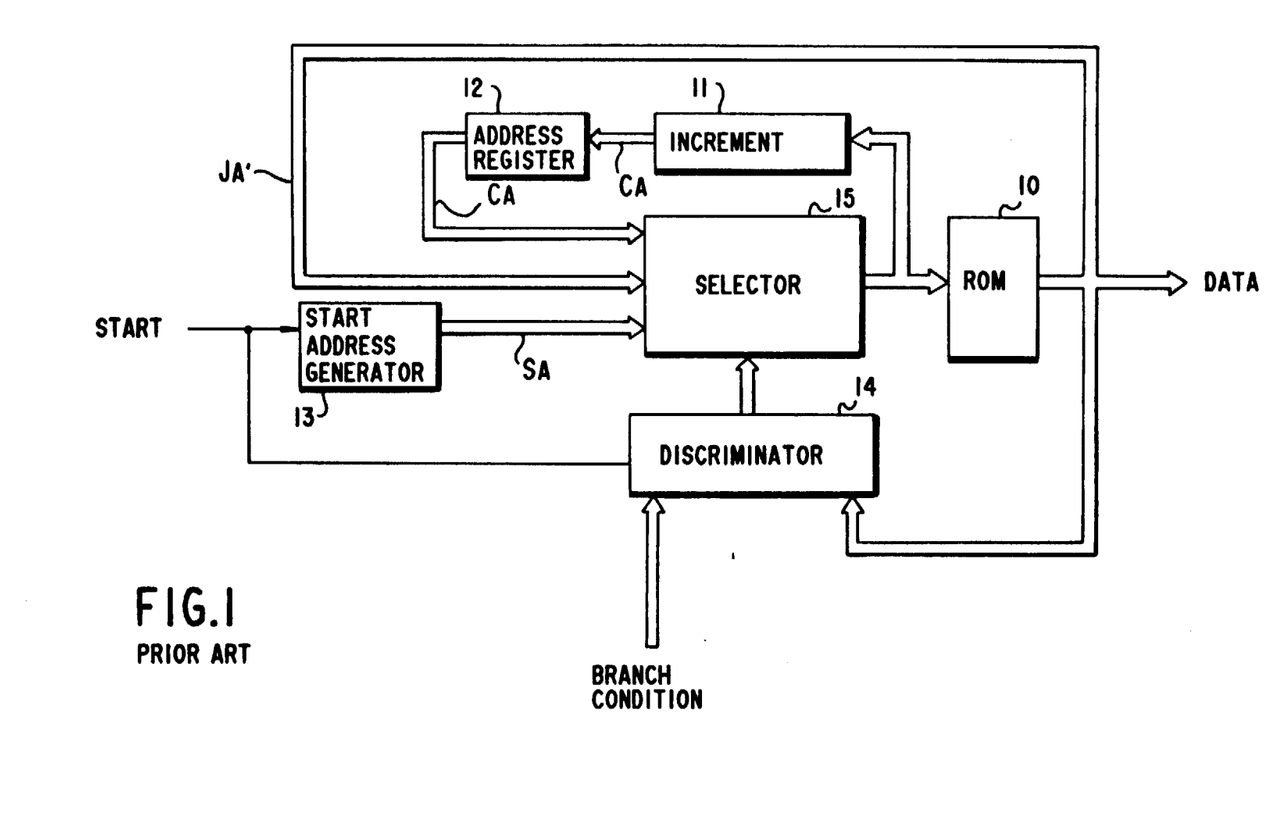
FIG. 1 is a system block diagram showing an essential part of an example of a conventional DMAC.

FIG. 1 shows an essential part of an example of a conventional DMAC, that is, a microsequencer of the conventional DMAC. In FIG. 1, the microsequencer includes a micro read only memory (ROM) 10 which stores microprograms, an increment circuit 11 which generates a continue address $C_A$ by incrementing (adding +1 to) an address which is presently executed, an address register 12 which latches the continue address $C_A$, a start address generating circuit 13 which generates a predetermined start address $S_A$ in response to a predetermined start signal START, a discriminating circuit 14 which discriminates whether or not a branch is to be made depending on various predetermined branch conditions, and a selection circuit 15 which operates responsive to a discrimination result obtained in the discriminating circuit 14. The selection circuit 15 normally selects the continue address $C_A$, selects the start address $S_A$ when the start signal START is received, and selects the data (a branch address $J_A'$) obtained from the micro ROM 10 when the branch is to be made.

Normally, according to this microsequencer, the data within the micro ROM 10 is successively obtained depending on the continue address $C_A$ and a required operation is carried out in an operation execution part (not shown) so as to carry out various functions of the DMAC. In addition, the branch address $J_A'$ is selected depending on an operation information obtained from the operation execution part or status information (so-called branch conditions) obtained from various registers (not shown), and a branch process is carried out by executing a predetermined sub program indicated by the branch address $J_A'$.

The branch process is carried out as follows, for example. That is, when the discriminating circuit 14 determines the branch conditions after examining the branch conditions and the data read out from the micro ROM 10 in an arbitrary step, the selection circuit 15 selects the branch address $J_A'$ at this point in time and a new branch address $J_A'$ is read out from the address of the micro ROM 10 indicated by the branch address $J_A'$. Then, the micro ROM 10 is addressed by the new branch address $J_A'$ and the process advances to the data processing of the branch address.

However, in the conventional DMAC, the branch address information is stored in the same microprogram. For this reason, when a branch is to be made, for example, an addressing operation must be carried out in duplicate by once obtaining the branch address $J_A'$ from the microprogram and then obtain the new branch address $J_A'$ for designating the sub program based on the previously obtained branch address $J_A'$. In other words, there is a problem in that the efficiency of the branch process is poor.

Figure 2:
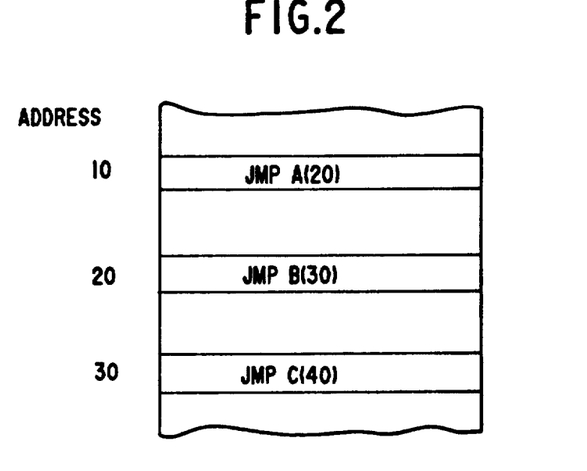
FIG. 2 shows an example of branch addresses stored in a micro ROM in the microsequencer of the conventional DMAC shown in FIG. 1.
Figure 3:
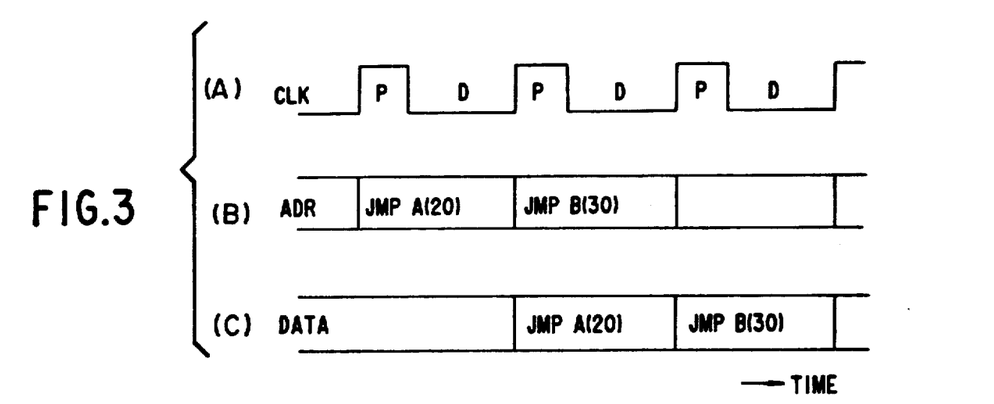
FIGS. 3(A) through 3(C) are timing charts for explaining branch processes shown in FIG. 2.

FIG. 2 shows an example of the branch addresses stored in the micro ROM 10. For example, a branch instruction "JMP A(20)" at an address "10" instructs a branch to an address "20" when certain branch conditions are satisfied. When the branch is made, a branch instruction "JMP B(30)" instructs a branch to an address "30" when certain branch conditions are satisfied. In this typical example, it takes three clock cycles to process the two branch instructions as may be seen from FIGS. 3(A) through 3(C). FIG. 3(A) shows a clock signal CLK, where P and D respectively denote precharge and discharge times of the micro ROM 10. FIGS. 3(B) and 3(C) respectively show the address ADR and the data DATA.

Especially in the case of recent DMACs which are provided with a plurality of kinds of transfer functions, there is a need to frequently carry out a branch process to switch the functions. Hence, the above described problem is particularly notable in this case.

SUMMARY OF THE INVENTION

Accordingly, it is a general object of the present invention to provide a novel and useful microprogram branching method and a microsequencer employing the microprogram branching method in which the problems described above are eliminated.

Another and more specific object of the present invention is to provide a microprogram branching method comprising the steps of generating a continue address by successively incrementing an address, generating a branch address by referring to a branch address table depending on predetermined branch conditions, where the branch address table prestores branch addresses, discriminating whether or not a branch is to be made depending on the predetermined branch conditions and obtaining a discrimination result, selecting the continue address normally and selecting the branch address when the discrimination result indicates that the branch is to be made, and outputting a data which is read out from an address of a main memory depending on the selected address, where the main memory prestores microprograms. According to the microprogram branching method of the present invention, it is possible to carry out a search operation to search for a branch address in parallel with an operation of discriminating whether or not a branch is to be made because the branch address is held separately from the main memory, and only one addressing of the main memory is needed when the branch is to be made. For this reason, the efficiency of the branch process is improved and the processing speed is improved thereby.

Still another object of the present invention is to provide a microsequencer adaptable to control each part of a direct memory access controller, comprising memory device for prestoring microprograms, first generating device for generating a continue address by successively incrementing an address, a branch address table which prestores branch addresses, second generating device for generating a branch address by referring to the branch address table depending on predetermined branch conditions, discriminating device for discriminating whether or not a branch is to be made depending on the predetermined branch conditions and for obtaining a discrimination result, selecting device for selecting the continue address normally and selecting the branch address when the discrimination result indicates that the branch is to be made, and output device for outputting a data which is read out from an address of the memory device depending on the address selected by the selecting device. The advantageous features referred above are particularly notable when the present invention is applied to a DMAC involving a large number of branch processes.

Other objects and further features of the present invention will be apparent from the following detailed description when read in conjunction with the accompanying drawings.

DETAILED DESCRIPTION

Figure 4:
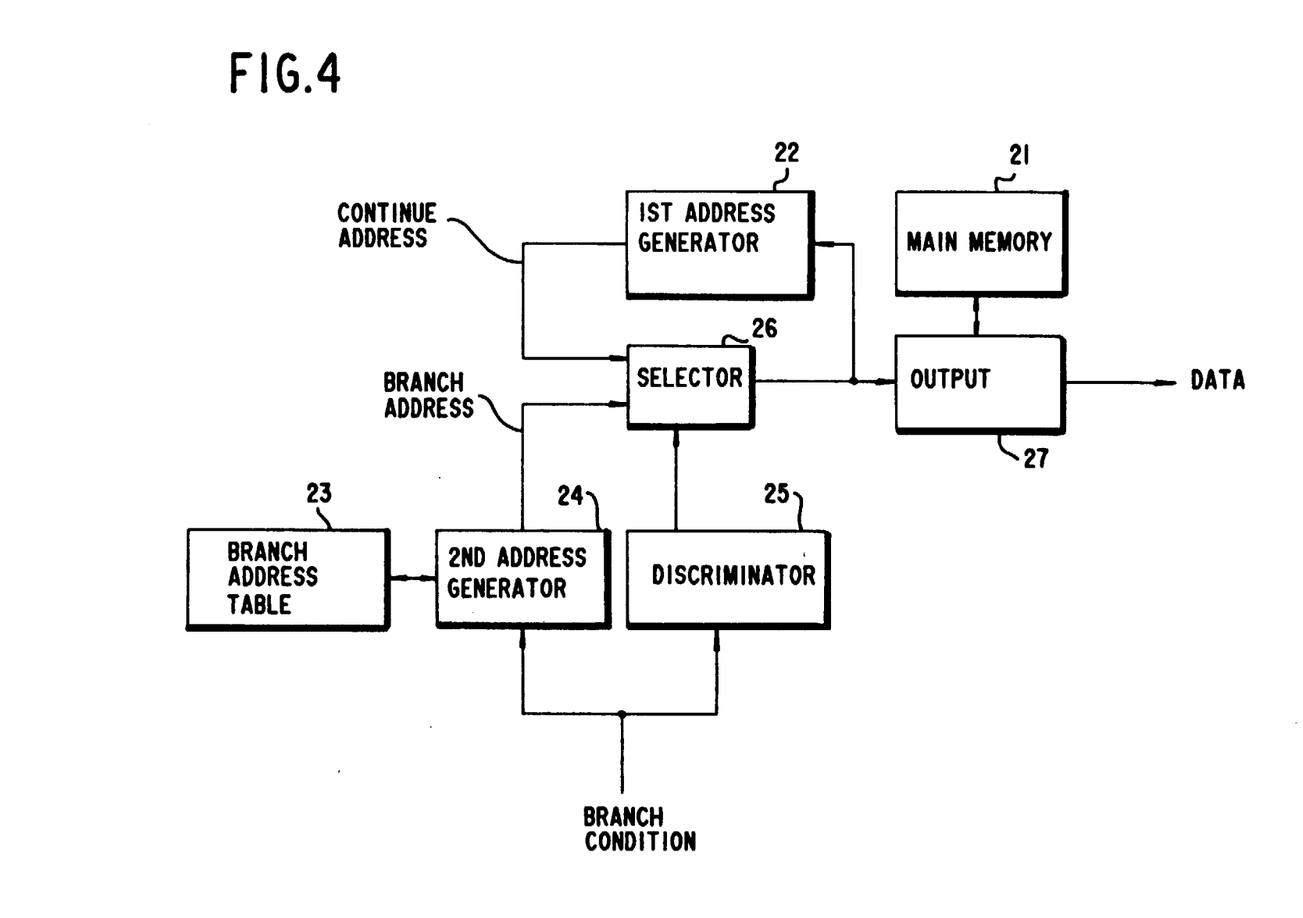
FIG. 4 is a system block diagram showing a first embodiment of a microsequencer according to the present invention for explaining an operating principle of the present invention.

FIG. 4 shows a first embodiment of a microsequencer according to the present invention. This embodiment of the microsequencer employs a first embodiment of a microprogram branching method according to the present invention. In FIG. 4, the microsequencer includes a main memory 21, a first address generator 22, a branch (jump) address table 23, a second address generator 24, a discriminator 25, a selector 26, and an output part 27. The first address generator 22 generates a continue address which is incremented by one from an address which is presently executed. The branch address table 23 stores branch (jump) addresses. The second address generator 24 refers to the branch address table 23 depending on predetermined branch conditions and generates a branch address. The discriminator 25 discriminates whether or not a branch is to be made depending on the predetermined branch conditions. The selector 26 operates based on a discrimination result of the discriminator 25, and normally selects the continue address and selects the branch address when the branch is to be made. The output part 27 obtains and outputs the data from a corresponding address within the main memory 21 dependent on the continue address or the branch address selected by the selector 26.

The second address generator 24 refers to the branch address table 23 and generates the branch address in parallel to the discriminator 25 which discriminates whether or not the branch is to be made. When the branch is to be made, the selector 26 selects the branch address and this branch address is used to output the data at the branch address of the main memory 21 in one addressing of the output part 27. Therefore, only one addressing is required at the time when the branch is to be made and the efficiency of the branch process is improved, thereby enabling a high-speed operation of the microsequencer.

Figure 5:
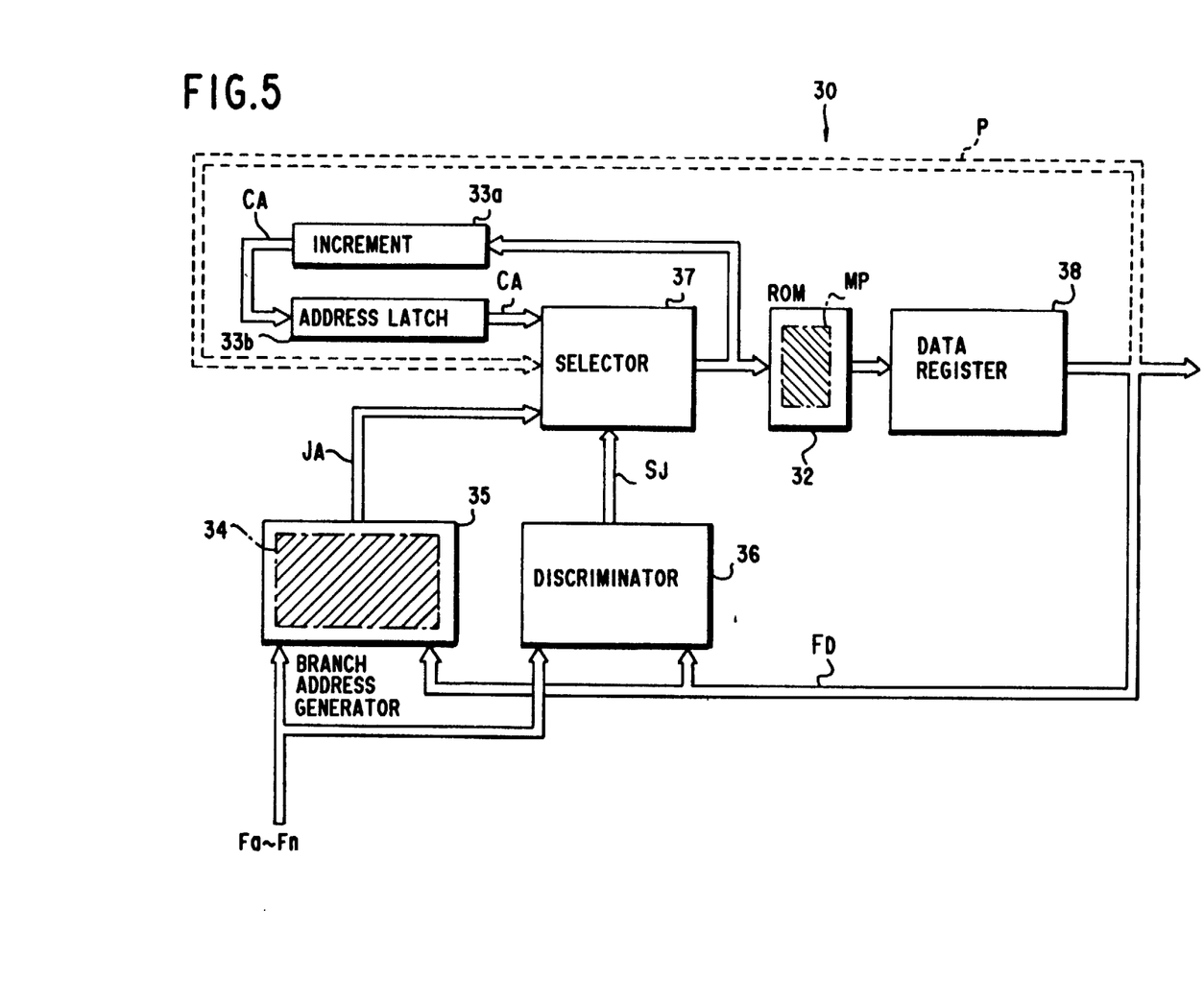
FIG. 5 is a system block diagram showing a second embodiment of the microsequencer according to the present invention.

Next, a description will be given of a second embodiment of the microsequencer according to the present invention, by referring to FIG. 5. In FIG. 5, a microsequencer 30 which constitutes a part of a direct memory access controller (DMAC) is supplied with various signals Fa through Fn indicative of the branch conditions from other parts of the DMAC which are not shown.

Figure 6:
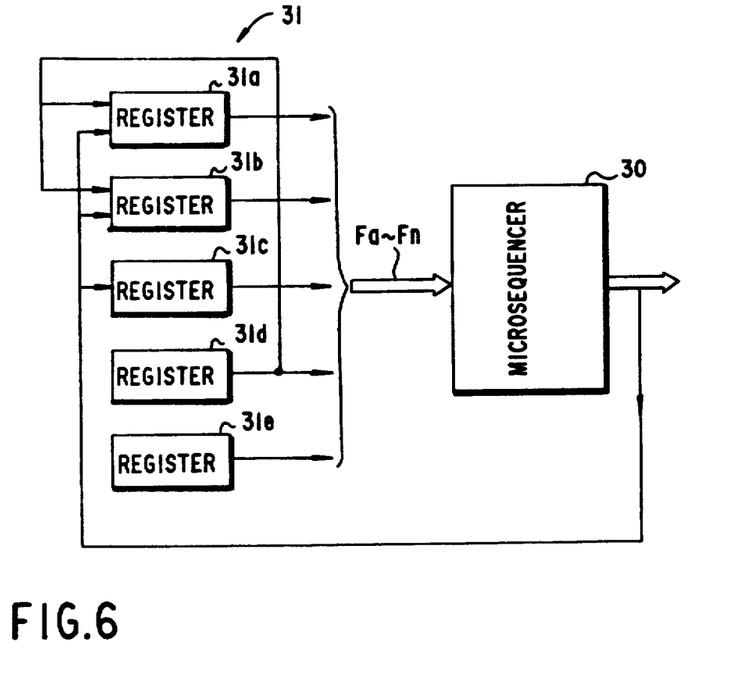
FIG. 6 is a system block diagram showing an essential part of a DMAC together with the microsequence shown in FIG. 5.

FIG. 6 shows an essential part of the DMAC together with the microsequencer 30. In FIG. 6, a circuit group 31 includes an error test circuit 31a for making an error check on a transfer mode which is to be used, a setting circuit 31b for setting the transfer conditions, and registers 31c through 31e for storing various status information and exception process information. Output signals of the circuit group 31 are supplied to the microsequencer 30 as the signals Fa through Fn.

Although omitted in FIG. 6, the DMAC actually has an operation execution part, a bus input/output control part, a first-in-first-out (FIFO) unit, an input/output buffer and the like.

Figure 7:
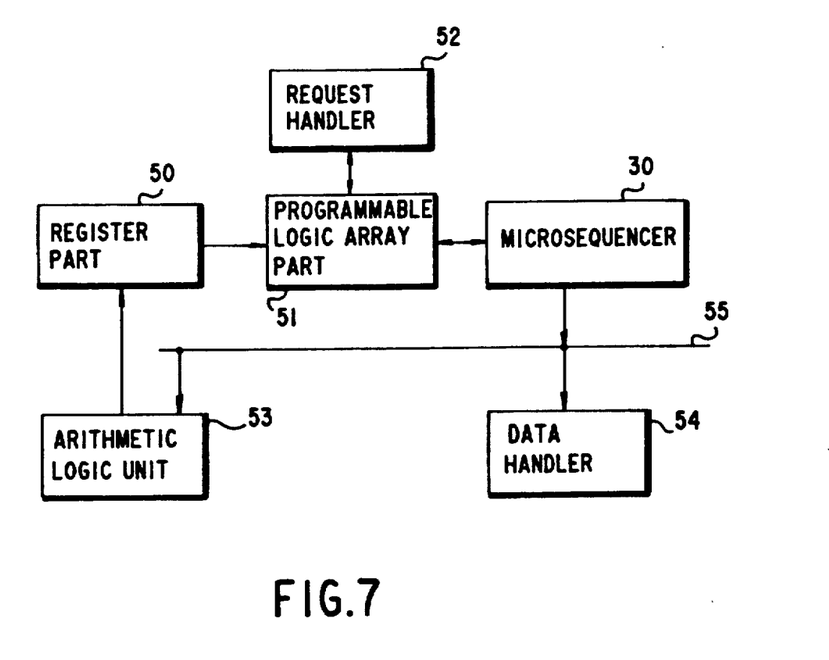
FIG. 7 is a system block diagram generally showing a construction of the DMAC.

FIG. 7 shows an essential part of the DMAC including the microsequencer 30 which controls each part of the DMAC by the microprograms. The DMAC includes the microsequencer 30, a register part 50, a PLA part 51, a request handler 52, an arithmetic logic unit (ALU) 53, a data handler 54, and an internal data bus 55. For example, the register part 50 includes a transfer mode register, an operation definition register and the like. The request handler 52 carries out various operations including determination of priorities of transfer requests, starting an internal process of the DMAC to inform the transfer request to each part of the DMAC and the like. The internal data bus 55 is used for transferring internal information such as transferring an output data of the PLA part 51 to the data handler 54. The ALU 53 carries out an addition or subtraction of the address and the byte count. The data handler 54 is connected to a system bus (not shown) and controls the exchange of signals between the DMAC and external devices coupled thereto. The central processing unit (CPU, not shown), the memory (not shown), the input/output interface (not shown) and the like of a data processing system which includes the DMAC are connected to the system bus.

Returning now to the description of FIG. 5, the microsequencer 30 has a micro ROM 32, an increment circuit 33a, an address latch 33b, a branch address table 34, a branch address generating circuit 35, a discriminating circuit 36, a selection circuit 37, and a data register 38. The increment circuit 33a functions as the first generator 22 shown in FIG. 4 and generates a continue address $C_A$ which is incremented by one from an address which is presently executed. The address latch 33b latches the continue address $C_A$ obtained from the increment circuit 33a. The branch address table 34 stores the branch addresses. The branch address generating circuit 35 refers to the branch address table 34 depending on signals Fa through Fn which are used as predetermined branch conditions and a read out data $F_D$, and generates a corresponding branch address as a branch address $J_A$. In other words, the branch address generating circuit 35 functions as the second address generator 24 shown in FIG. 4. The discriminating circuit 36 discriminates the whether or not the branch is to be made based on the signals Fa through Fn (predetermined branch conditions), the read out data $F_D$ and the like and outputs a signal $S_J$ indicative of the discrimination result. The discriminating circuit 36 functions as the discriminator 25 shown in FIG. 4. The selection circuit 37 normally selects the continue address $C_A$ and selects the branch address $J_A$ when the signal $S_J$ indicates that the branch is to be made. The selection circuit 37 functions as the selector 26 shown in FIG. 4. The data register 38 holds the data obtained from the micro ROM 32, and the micro ROM 32 and the data register 38 constitute the output part 27 shown in FIG. 4.

Figure 12:
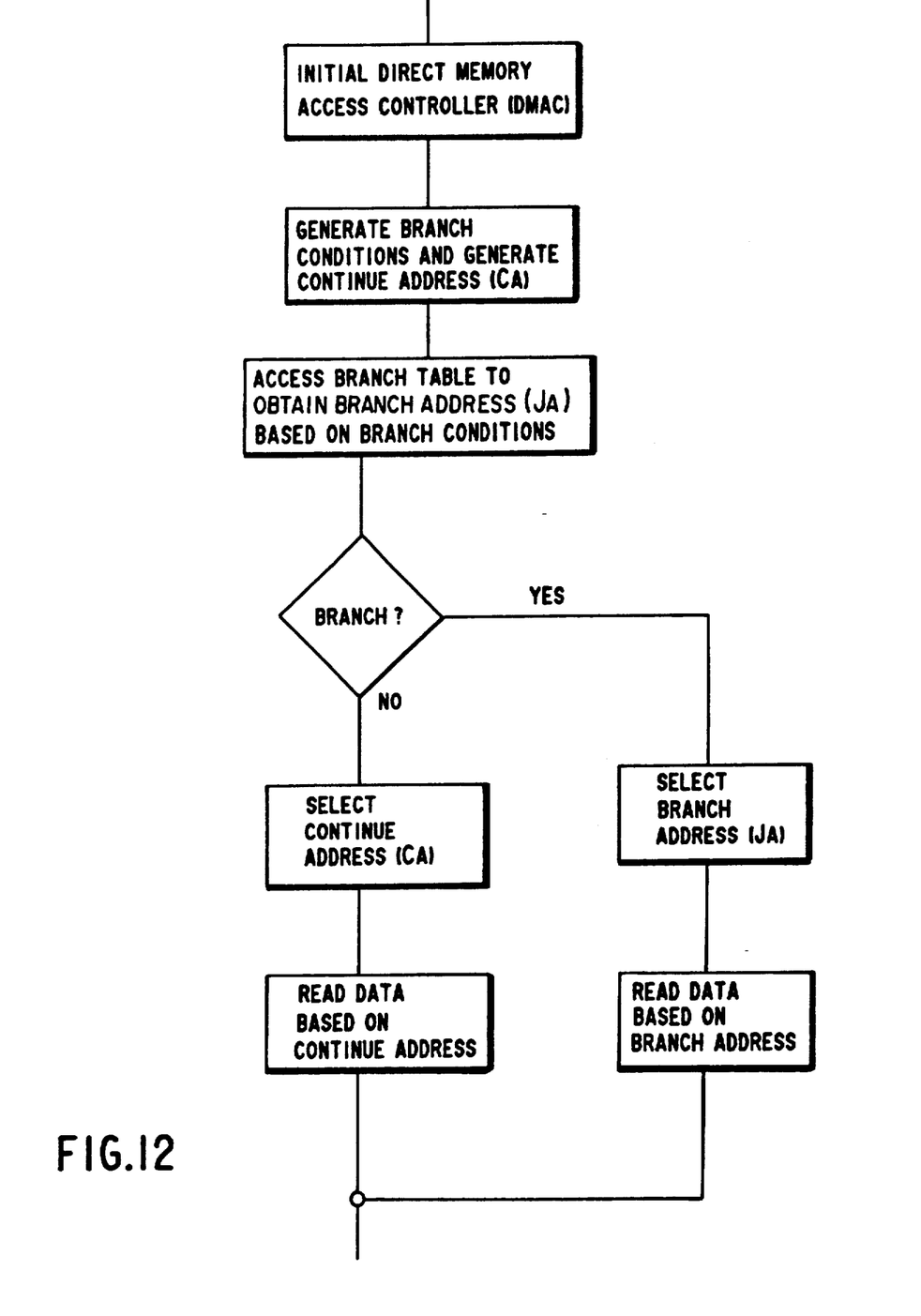
FIG. 12 shows a flow chart for the branching method.

Next, a description will be given of an operation of this embodiment (see FIG. 12). Generally, an initial setting of the DMAC is made by the CPU and the DMAC obtains an exclusive right to use the system bus from the CPU to control a data transfer between the input/output interface and the memory, for example. The DMAC also selects various transfer modes depending on a content of the initial setting and carries out processes such as various exception processes which include interrupt processes and various error processes. For this reason, based on the initial setting made from the CPU and the status information obtained from the input/output device and the memory, for example, the DMAC generates the signals Fa through Fn for use in selecting the mode and branching to various processes and also carries out appropriate processes by reading out required data depending on the signals Fa through Fn.

In other words, while the microsequencer 30 is operating, the discriminating circuit 36 discriminates whether or not the branch is to be made depending on the signals Fa through Fn, and the selection circuit 37 selects the continue address $C_A$ when the discriminating circuit 36 discriminates that no branch is to be made. Accordingly, the microsequencer 30 obtains and outputs microprograms MP step by step and the operation execution part (not shown) successively carries out processes with respect to the obtained data.

On the other hand, when the discriminating circuit 36 discriminates that the branch is to be made, the selection circuit 37 selects the branch address $J_A$ in response to the signal $S_J$ which is obtained from the discriminating circuit 36. The branch address $J_A$ is mapped from the branch address table 34 in parallel to the discrimination operation of the discriminating circuit 36, and is obtained as the branch address $J_A$ when the discriminating circuit 36 discriminates that no branch is to be made. Hence, the operations carried out from a time when the branch is to be made to a time when the branch address $J_A$ is selected are carried out approximately at the same time, and as a result, a data corresponding to the branch address is immediately obtained from the microprogram MP after the branch is completed. That is, according to this embodiment, it is possible to advance to the processing of the branch address in one operation without having to carry out first and second operations as in the conventional case, the first operation being to obtain the branch address from the microprogram MP after the branch and the second operation being to address the microprogram MP by the obtained branch address and to obtain the data at the branch address. In addition, it is possible to select an appropriate address from the plurality of branch addresses by referring to the branch address table 34, whereas it is only possible to select from two addresses in the conventional case. Therefore, it is possible to improve the efficiency of the branch process and increase the processing speed. These advantageous features of this embodiment are particularly notable when applied to a DMAC involving a large number of conditional branch processes.

In the conventional case, the number of program steps is increased by the need to make two addressings, but this embodiment requires only one addressing. Moreover, the number of program steps can be reduced considerably because the table of the branch addresses is provided outside of the program.

Figure 8:
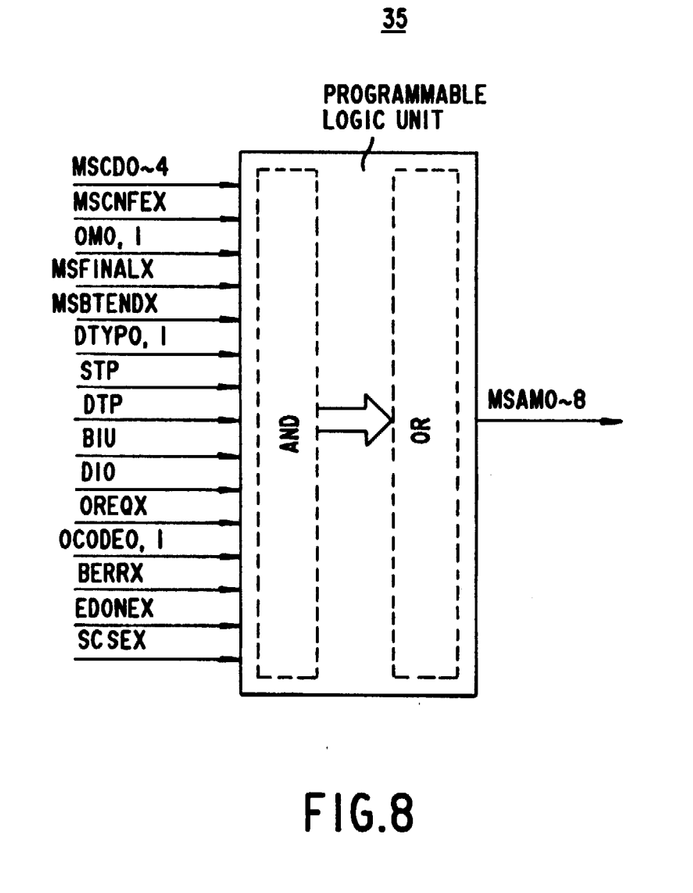
FIG. 8 is a system block diagram showing an embodiment of a branch address generating circuit of the microsequencer shown in FIG. 6.
Figure 9:
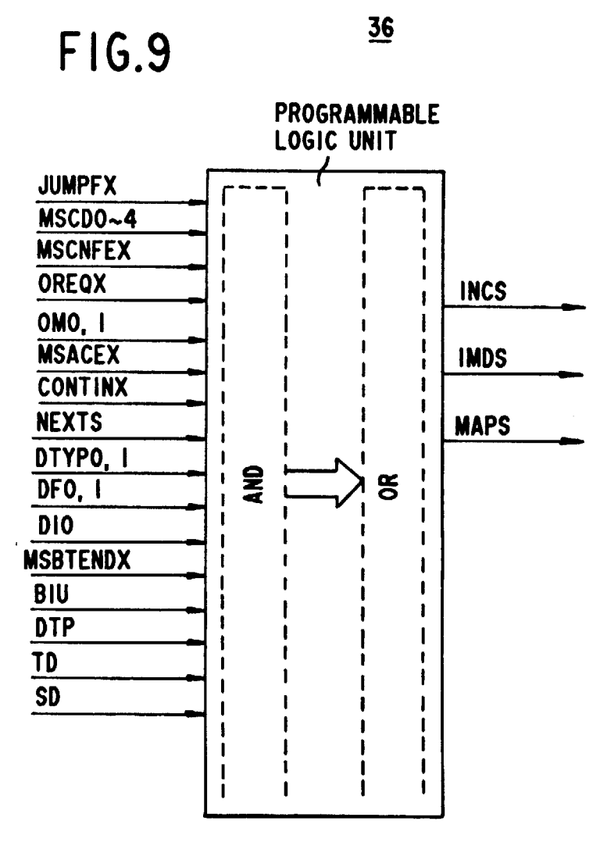
FIG. 9 is a system block diagram showing an embodiment of a discriminating circuit of the microsequencer shown in FIG. 6.

FIGS. 8 and 9 respectively show an embodiment of the branch address generating circuit 35 and an embodiment of the discriminating circuit 36. The branch address generating circuit 35 and the discriminating circuit 36 are respectively constituted by programmable logic arrays (PLAs).

First, a description will be given of signals supplied to the branch address generating circuit 35 shown in FIG. 8. Signals MSCD0 through MSCD4 are output signals of the micro ROM 32 which designate the kind of branch instruction and are obtained via the data register 38. In this embodiment, it is possible to discriminate 128 kinds of conditions from "00000" to "11111" by a field of the five bits. A configuration error signal MSCNFEX indicates that an abnormality exists in the initial setting (register setting made by the user) of the DMAC and that the DMAC is inoperative. This configuration error signal MSCNFEX is output from a test circuit (not shown). Operation mode signals OM0 and OM1 indicate a part of the content of the transfer mode register of the register part 50 which is initially set in a field of two bits. Because the process of the DMAC differs depending on whether the operation mode is a register direct, sequential descriptor chain or a link descriptor chain, the operation mode signals OM0 and OM1 are supplied to the branch address generating circuit 35 to discriminate the conditions. A signal MSFINALX indicates a termination of the DMA transfer and is outputted from the PLA part 51 which carries out a process in parallel to the microsequencer 30. The branch address generating circuit 35 generates an address for carrying out the termination process responsive to the signal MSFINALX when predetermined conditions are satisfied. A signal MSBTENDX indicates a termination of all of the transfers of one block of descriptors, and thus, this signal MSBTENDX has a meaning only in the descriptor chain mode in which the signals OM0 and OM1 have a value "1X". Device type signals DTYP0 and DTYP1 indicate a part of the content of the operation definition register of the register part 50 which is initially set in a field of two bits. The device type signals DTYP0 and DTYP1 designate the type of device connected to the DMAC. Because the internal process of the DMAC differs depending on the device type, the device type signals DTYP0 and DTYP1 are supplied to the branch address generating circuit 35 to discriminate the conditions.

A source type signal STP and a destination type signal DTP respectively indicate a part of the content of the operation definition register in a field of one bit. The signals STP and DTP indicate whether an input/output interface or a memory is connected to the DMAC. Because the internal process of the DMAC differs depending on whether the input/output interface or the memory is connected to the DMAC, the signals STP and DTP are supplied to the branch address generating circuit 35 to discriminate the conditions. Signals BIU and DIO respectively indicate a part of the content of the transfer mode register in a field of one bit. An operation request signal OREQX is an internal signal for requesting a process with respect to the microsequencer 30 from the request handler 52 of the DMAC. Signals OCODE0 and OCODE1 are signals for designating the kind of requested operation. In this embodiment, it is possible to make up to four kinds of process requests to the microsequencer 30 from the request handler 52 because the kinds of requests are designated in a field of two bits. A bus error signal BERRX, an external done signal EDONEX and a slave chip select error signal SCSEX are signals for informing an abnormal termination (exception) to the DMAC. The DMAC makes a corresponding abnormal process with a highest priority when these signals BERRX, EDONEX and SCSEX are asserted. Signals MSMA0 through MSMA8 are output from the branch address generating circuit 35.

Figure 10:
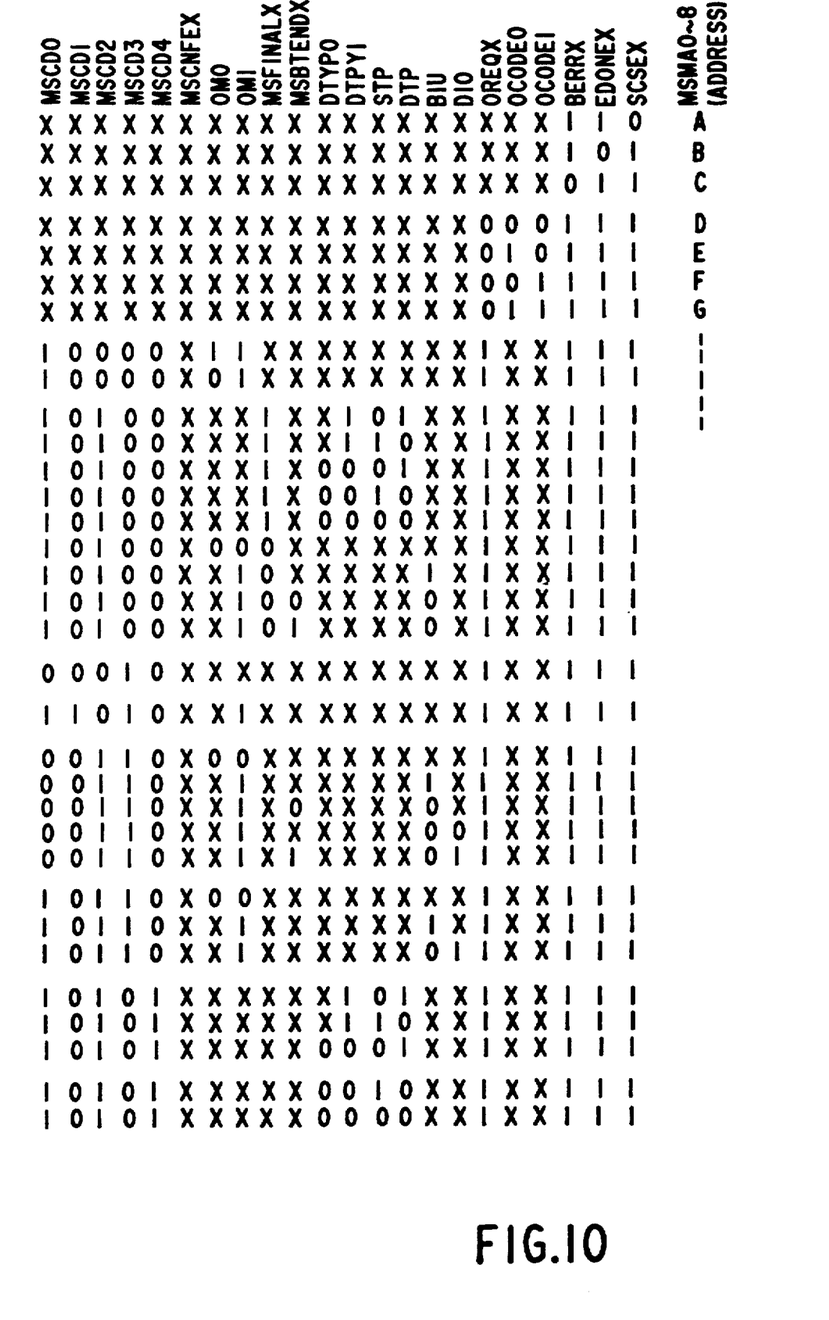
FIG. 10 shows an embodiment of a relationship between input and output signals of the branch address generating circuit shown in FIG. 8.

FIG. 10 shows an embodiment of a relationship between the input and output signals of the branch address generating circuit 35 shown in FIG. 8. In FIG. 10, the same signal designations are used as in FIG. 8, and a symbol "X" denote a "don't care".

Next, a description will be given of signals supplied to the discriminating circuit 36 shown in FIG. 9. A branch flag signal JUMPFX indicates whether or not a code (MSCD0 through MSCD4) outputted from the microsequencer 30 is valid, that is, whether or not a branch is to be made. An access error signal MSACEX is a signal for informing an error which occurs when a transfer is started in a channel which corresponds to a channel in which an exception process remains to be made. In other words, the access error signal MSACEX indicates that the user has made an access to a register of the DMAC when certain conditions are not satisfied. For example, when starting a transfer in a channel, the channel must be made active by writing an information "1" in a start bit of a register of the register part 50 which corresponds to the channel, but when an exception process remains to be made an access error is generated by discriminating that an error recovery of a previously made transfer has not been made. A continue signal CONTINX indicates that a process which is presently executed is re-executed, and this continue signal CONTINX is output from the PLA part 51 which carries out the process in parallel to the microsequencer 30. For example, when the process of the source is presently carried out and and the continue signal CONTINX is asserted, the process of the source is carried out again in the next bus cycle.

A next side signal NEXTS indicates whether the next process is carried out by the source or the destination, and this next side signal NEXTS is output from the PLA part 51 which carries out the process in parallel to the microsequencer 30. Descriptor format signals DF0 and DF1 respectively indicate a part of the content of the transfer mode register of the register part 50 which is initially set in a field of two bits. A transfer/descriptor signal TD indicates whether the process which is presently carried out is a transfer process or a descriptor process, and a source/destination signal SD indicates whether the present process is carried out by the source or the destination. A selection signal INCS indicates an incrementor route (an address obtained by incrementing the present address by one), a selection signal IMDS indicates an immediate route (an address directly designated by the micro ROM 32), and a selection signal MAPS indicates a branch address generating circuit route (an address output from the branch address generating circuit 35).

Figure 11:
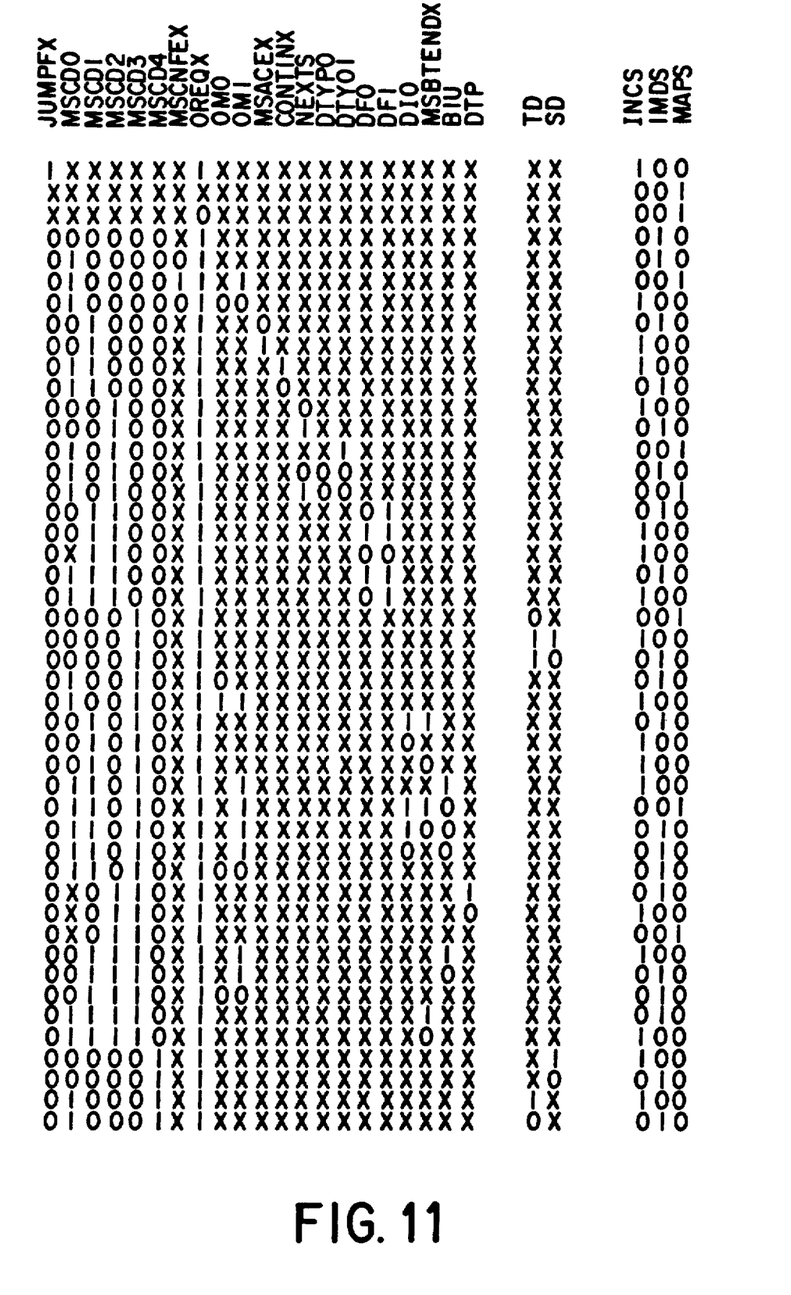
FIG. 11 shows an embodiment of a relationship between input and output signals of the discriminating circuit shown in FIG. 9.

FIG. 11 shows an embodiment of a relationship between the input and output signals of the discriminating circuit 36 shown in FIG. 9. In FIG. 11, the same signal designations are used as in FIG. 9, and a symbol "X" denote a "don't care".

In FIGS. 8 and 9, the input signals MSCD0 through MSCD4 and JUMPFX to the circuits 35 and 36 correspond to the read out data $F_D$, and the remaining input signals to the circuits 35 and 36 correspond to the signals Fa through Fn.

As a modification of this embodiment, it is also possible to couple the data register 38 and the selection circuit 37 by a path P indicated by a phantom line and make the selection circuit 37 select the signal obtained from this path P depending on the discriminated result in the discrimination circuit 36. For example, the path P is used and the selecting circuit 37 selects the data obtained via the path P when the branch which is presently processed instructs an unconditional branch.

Further, the present invention is not limited to these embodiments, and various variations and modifications may be made without departing from the scope of the present invention.

What is claimed is:

1. A microprogram branching method comprising the steps of:
   generating a next microinstruction address by successively incrementing an address of current microinstruction;
   generating a branched next microinstruction address from a branch address table based on predetermined operating condition signals, said branch address table prestoring a plurality of branch addresses in correspondence with operating condition signals;
   discriminating whether or not a branch is to be made depending on the predetermined operating condition signals and obtaining a discrimination result;

selecting the next microinstruction address normally and selecting the branched next microinstruction address when the discrimination result indicates that the branch is to be made; and outputting data from an address location of a main memory depending on the selected address, said main memory prestoring microprograms.

2. The microprogram branching method as claimed in claim 1 wherein said selecting step designates the data which is to be read out from the main memory based on the selected address and said output step outputs said data based on the discrimination result when said discriminating step discriminates certain branch conditions.

3. The microprogram branching method as claimed in claim 2 wherein said selecting step selects the data from the main memory based on said selected address and said output step outputs said data when a branch, which is presently processed, is an unconditional branch.

4. The microprogram branching method as claimed in claim 1 wherein said latter generating step and said discriminating step respectively use a programmable logic array.

5. The microprogram branching method as claimed in claim 1 which is employed in a microsequencer which controls each part of a direct memory access controller by the microprograms.

6. A microsequencer adaptable to control each part of a direct memory access controller, said microsequencer comprising:

memory means for prestoring microprograms;

first generating means for generating a next microinstruction address by successively incrementing an address of current microinstruction;

a branch address table prestored with a plurality of branch addresses in correspondence with operating condition signals;

second generating means for generating a branched next microinstruction address from said branch address table based on predetermined operating condition signals;

discriminating means for discriminating whether or not a branch is to be made based on the predetermined operating condition signals and for obtaining a discrimination result;

selecting means for selecting the next microinstruction address normally and selecting the branched next microinstruction address when the discrimination result indicates that the branch is to be made; and output means for outputting data which is read out from an address location of said memory means based on the address selected by said selecting means wherein, said second generating means generating said branched next microinstruction address prior to said selecting means selecting an address based on the discriminating result.

7. The microsequencer as claimed in claim 6 wherein said selecting means selects the data from said memory means based on said selected address and said output means outputs said data via said output means based on the discrimination result when said discriminating means discriminates certain branch conditions.

8. The microsequencer as claimed in claim 7 wherein said selecting means selects the data from said memory means based on said selected address and said output means outputs said data via said output means when a branch which is presently processed is an unconditional branch.

9. The microsequencer as claimed in claim 6 wherein said second generating means and said discriminating means are respectively made up of a programmable logic array.

10. The microsequencer as claimed in claim 6 wherein said memory means comprises a read only memory.

11. The microsequencer as claimed in claim 6 wherein said memory means comprises a read only memory and said output means comprises a register for storing an output data of said read only memory.

* * * * *